United States Patent
Murthy et al.

(10) Patent No.: US 9,571,493 B2
(45) Date of Patent: Feb. 14, 2017

(54) SYSTEM AND METHOD FOR A STORAGE AREA NETWORK VIRTUALIZATION OPTIMIZATION

(71) Applicant: INTERNATIONAL BUSINESS MACHINES CORPORATION, Armonk, NY (US)

(72) Inventors: Seshashayee S. Murthy, Yorktown Heights, NY (US); Ramani R. Routray, San Jose, CA (US); Sandeep M. Uttamchandani, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 64 days.

(21) Appl. No.: 13/967,405

(22) Filed: Aug. 15, 2013

(65) Prior Publication Data
US 2013/0333000 A1    Dec. 12, 2013

Related U.S. Application Data

(63) Continuation of application No. 13/467,654, filed on May 9, 2012, now Pat. No. 8,539,071, which is a continuation of application No. 12/725,952, filed on Mar. 17, 2010, now Pat. No. 8,266,280.

(51) Int. Cl.
| | |
|---|---|
| *G06F 15/16* | (2006.01) |
| *H04L 29/06* | (2006.01) |
| *G06F 3/06* | (2006.01) |
| *H04L 29/08* | (2006.01) |

(52) U.S. Cl.
CPC ............... *H04L 63/10* (2013.01); *G06F 3/067* (2013.01); *G06F 3/0613* (2013.01); *G06F 3/0635* (2013.01); *H04L 67/1097* (2013.01); *H04L 69/32* (2013.01)

(58) Field of Classification Search
CPC ................ H04L 45/22; G06F 17/30528; G06F 19/45533; G06F 3/0635; G06F 3/0644; G06F 3/067
USPC ......... 711/111, 147; 709/224, 222, 223, 217; 370/254; 713/201; 707/10; 705/50
See application file for complete search history.

(56) References Cited

U.S. PATENT DOCUMENTS

| | | | |
|---|---|---|---|
| 7,051,182 B2 | 5/2006 | Blumenau et al. | |
| 7,085,242 B2 | 8/2006 | Liu | |
| 7,194,538 B1 * | 3/2007 | Rabe et al. | 709/224 |
| 7,272,139 B2 | 9/2007 | Fitzpatrick et al. | |
| 7,275,103 B1 * | 9/2007 | Thrasher | H04L 45/22 709/223 |
| 7,403,987 B1 * | 7/2008 | Marinelli et al. | 709/223 |
| 7,523,286 B2 | 4/2009 | Ramany et al. | |
| 7,549,017 B2 | 6/2009 | Chandrasekaran et al. | |
| 8,144,618 B2 * | 3/2012 | Graves | 370/254 |
| 8,175,006 B2 | 5/2012 | Lee et al. | |

(Continued)

*Primary Examiner* — Dustin Nguyen
(74) *Attorney, Agent, or Firm* — Christopher Mclane; Andrew M. Calderon; Roberts Mlotkowski Safran, Cole & Calderon, P.C.

(57) ABSTRACT

A method is implemented in a computer infrastructure having computer executable code tangibly embodied on a computer readable storage medium having programming instructions. The programming instructions are operable to determine one or more optimal mappings between a server layer and a storage layer through a network layer based on performance metrics of one or more ports of at least one of the server layer, the storage layer and the network layer.

11 Claims, 5 Drawing Sheets

(56) References Cited

U.S. PATENT DOCUMENTS

| | | | |
|---|---|---|---|
| 2003/0142628 A1 | 7/2003 | Alonso et al. | |
| 2003/0163727 A1* | 8/2003 | Hammons et al. | 713/201 |
| 2004/0139240 A1 | 7/2004 | DiCorpo et al. | |
| 2007/0043860 A1 | 2/2007 | Pabari | |
| 2007/0130344 A1 | 6/2007 | Pepper | |
| 2007/0168581 A1 | 7/2007 | Klein et al. | |
| 2007/0239944 A1* | 10/2007 | Rupanagunta et al. | 711/147 |
| 2008/0177871 A1* | 7/2008 | Howard et al. | 709/222 |
| 2009/0083484 A1* | 3/2009 | Basham et al. | 711/114 |
| 2009/0199177 A1 | 8/2009 | Edwards et al. | |
| 2009/0210427 A1* | 8/2009 | Eidler et al. | 707/10 |
| 2009/0228541 A1 | 9/2009 | Barsness et al. | |
| 2010/0198730 A1* | 8/2010 | Ahmed | G06F 17/30528 705/50 |
| 2011/0161291 A1 | 6/2011 | Taleck et al. | |
| 2013/0013738 A1* | 1/2013 | Astete | G06F 9/45533 709/217 |

\* cited by examiner

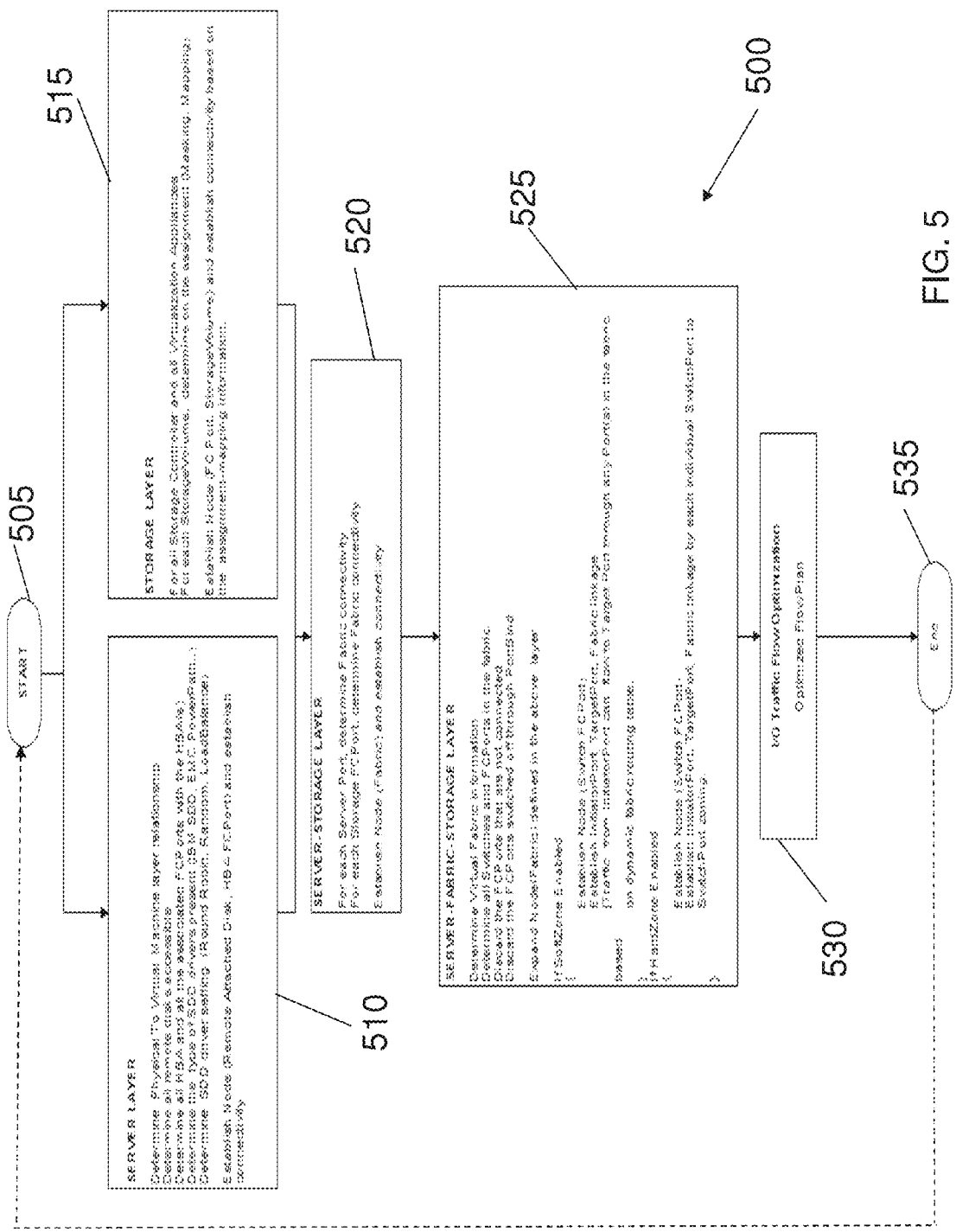

SYSTEM AND METHOD FOR A STORAGE AREA NETWORK VIRTUALIZATION OPTIMIZATION

FIELD OF THE INVENTION

The present invention generally relates to networks, and more particularly, to a method and system for a storage area network (SAN) virtualization optimization.

BACKGROUND

A computer network is a group of computers that are connected to each other for the purpose of communication. Any computer network is classified on the basis of a wide variety of characteristics. Networks are often classified as Local Area Network (LAN), Wide Area Network (WAN), Metropolitan Area Network (MAN), Personal Area Network (PAN), Virtual Private Network (VPN), Campus Area Network (CAN), Storage Area Network (SAN), etc. depending on their scale, scope and purpose. Usage, trust levels and access rights often differ between these types of network; for example, LANs tend to be designed for internal use by an organization's internal systems and employees in individual physical locations (such as a building), while WANs may connect physically separate parts of an organization to each other and may include connections to third parties.

Storage virtualization refers to the process of separating (through abstraction) logical storage from physical storage. The term is used to describe this separation at any layer in the storage software and hardware stack. Virtualization of storage, for example, helps achieve location independence by abstracting the physical location of the data. The virtualization system presents to the user a logical space for data storage and itself handles the process of mapping it to the actual physical location.

A virtual private server (VPS, also referred to as Virtual Dedicated Server or VDS) is a method of splitting a server. Each virtual server can run its own full-fledged operating system, and each server can be independently rebooted. The practice of partitioning a single server so that it appears as multiple servers has seen a resurgence lately with the development of virtualization software and technologies for other architectures. Virtual private servers bridge the gap between shared web hosting services and dedicated hosting services, giving independence from other customers of the VPS service in software terms but at less cost than a physical dedicated server. There is an increasing focus on server and storage virtualization with little emphasis on network virtualization.

Accordingly, there exists a need in the art to overcome the deficiencies and limitations described herein above.

SUMMARY

In a first aspect of the invention, a method is implemented in a computer infrastructure having computer executable code tangibly embodied on a computer readable storage medium having programming instructions. The programming instructions are operable to determine one or more optimal mappings between a server layer and a storage layer through a network layer based on performance metrics of one or more ports of at least one of the server layer, the storage layer and the network layer.

In another aspect of the invention, a system comprises a network virtualization optimizer (NVO) operable to determine one or more optimal mappings between a server layer and a storage layer through a network layer based on performance metrics of one or more ports of at least one of the server layer, the storage layer and the network layer. The one or more optimal mappings comprise one or more dynamically optimized data center configurations. The determining the one or more optimal mappings comprises a determination of at least one of a server multipathing, mapping, a masking a soft zone and a hard zone to at least one of allocate and deallocate optimized path selection dynamically. The one or more optimal mappings provide at least one of: security, over-provisioning, boundary values for one or more devices.

In an additional aspect of the invention, a computer program product comprising a computer usable storage medium having readable program code embodied in the medium is provided. The computer program product includes at least one component operable to determine dynamically in real time one or more optimal mappings between a server layer and a storage layer through a network layer based on performance metrics of one or more ports of at least one of the server layer, the storage layer and the network layer. The determining the one or more optimal mappings comprises three linear programming phases.

In a further aspect of the invention, a computer system for at least one of modeling and forecasting technology adoption, the system comprises a CPU, a computer readable memory and a computer readable storage media. Additionally, the system comprises first program instructions to determine one or more optimal mappings between a server layer and a storage layer through a network layer based on performance metrics of one or more ports of at least one of the server layer, the storage layer and the network layer. The determining the one or more optimal mappings comprises at least one of dynamically determining and configuring at least one of a hard zone and a soft zone within a network layer. The at least one of the hard zone and the soft zone within the network layer enables a port of a server to see a port of a storage system. A soft zone is a connection between one or more within a fabric of the network layer. A hard zone guides traffic at least one of within a switch and between two or more ports of the switch of the fabric in the network layer. The first program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIG. 5 shows an exemplary flow in accordance with aspects of the invention.

DETAILED DESCRIPTION

Figure 1:
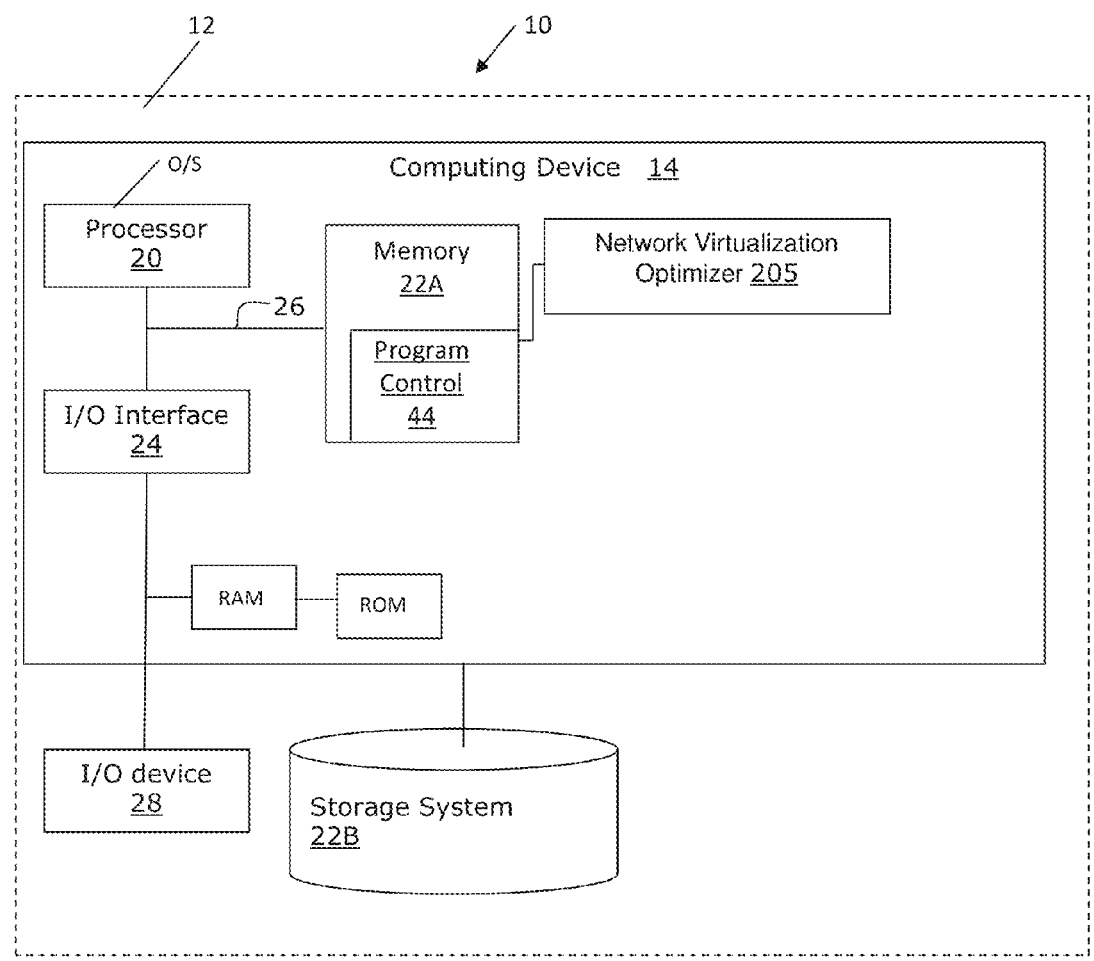
FIG. 1 an illustrative environment for implementing the steps in accordance with aspects of the invention.

The present invention generally relates to networks, and more particularly, to a method and system for a network virtualization optimization, leveraging end-to-end application-server-storage-network knowledge for decision making. Networks, for example, play an important role in the end-to-end application performance. Also, networks may be an entry-point for several switch vendors to provide value-add services (such as, for example, storage block appliance, quality of service (QoS), path re-routing during failures, etc.). Furthermore, networks potentially minimize the storage virtualization effort from end-to-end vendors. In accordance with aspects of the invention, data collected from an end-to-end information technology (IT) virtualization framework is leveraged to continuously analyze and optimize the network virtualization layer based on the varying application workload characteristics.

Network virtualization is the process of combining hardware and software network resources and network functionality into a single, software-based administrative entity, a virtual network. Network virtualization involves platform virtualization, often combined with resource virtualization. A virtual network is a computer network that consists, at least in part, of virtual network links. A virtual network link is a link that does not consist of a physical (wired or wireless) connection between two computing devices but is implemented using methods of network virtualization. Components of a virtual network may include: network hardware, such as switches and network adapters, also known as network interface cards (NICs); networks, such as, for example, virtual LANs (VLANs) and containers such as virtual machines; Network storage devices; and/or network media, such as, for example, Ethernet and Fibre Channel.

The analysis and optimization of network virtualization in enterprise IT data-centers is different from the traditional TCP/IP and other flow-control techniques. In accordance with aspects of the invention, network virtualization enforces access control to data by enabling or disabling I/O traffic initiated from server targeted for a storage volume on a storage controller. These security primitives provide logical separation of different I/O traffic in a storage area network. Logical separations are achieved by: i) a multipath driver at the Server level; ii) zoning at the Fiber Channel network level; and iii) Assignment at Storage Controller level.

Network virtualization configuration may typically be done at the time of initial application deployment. The configuration setup may be over-provisioned and/or arranged non-optimally with regard to security. In accordance with aspects of the present invention, in embodiments, the network virtualization optimizer (NVO) is a continuous network virtualization planner operable to gather information regarding applications, their end-to-end server-storage-network deployment, and historic performance data, typically aggregated by off-the-shelf storage resource management (SRMs) (such as IBM® Tivoli® Storage Productivity Center (TPC). (IBM and Tivoli are registered trademarks of International Business Machines Corporation in the United States, other countries, or both.) In addition, in embodiments, the NVO tracks disaster recovery (DR), backup, and archive configurations that impose a batch (ON/OFF) load on IT setup. The output of NVO is an optimal network configuration generator within the security constraints of the original application configuration.

By implementing the present invention, the I/O flow layout of a data center may be optimally organized. Additionally, implementing the present invention allows for creation of a plan, e.g., an offline or online/live migration plan, to rearrange the data center for an optimally load-balanced I/O traffic. Furthermore, implementing the present invention provides a deployment and/or an orchestration sequence in an offline fashion by completely migrating the data center I/O traffic pattern, or thru live migration, by a non-interruptive step approach.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
 an electrical connection having one or more wires,
 a portable computer diskette,
 a hard disk,
 a random access memory (RAM),
 a read-only memory (ROM),
 an erasable programmable read-only memory (EPROM or Flash memory),
 an optical fiber,
 a portable compact disc read-only memory (CDROM),
 an optical storage device,
 a transmission media such as those supporting the Internet or an intranet, or
 a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls a network virtualization optimizer (NVO) 205. The NVO 205 is operable to dynamically determine, e.g., in real time, one or more optimal paths in a network level, e.g., the processes described herein. The NVO 205 can be implemented as one or more program code in the program control 44 stored in memory 22A as separate or combined modules. Additionally, the NVO 205 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
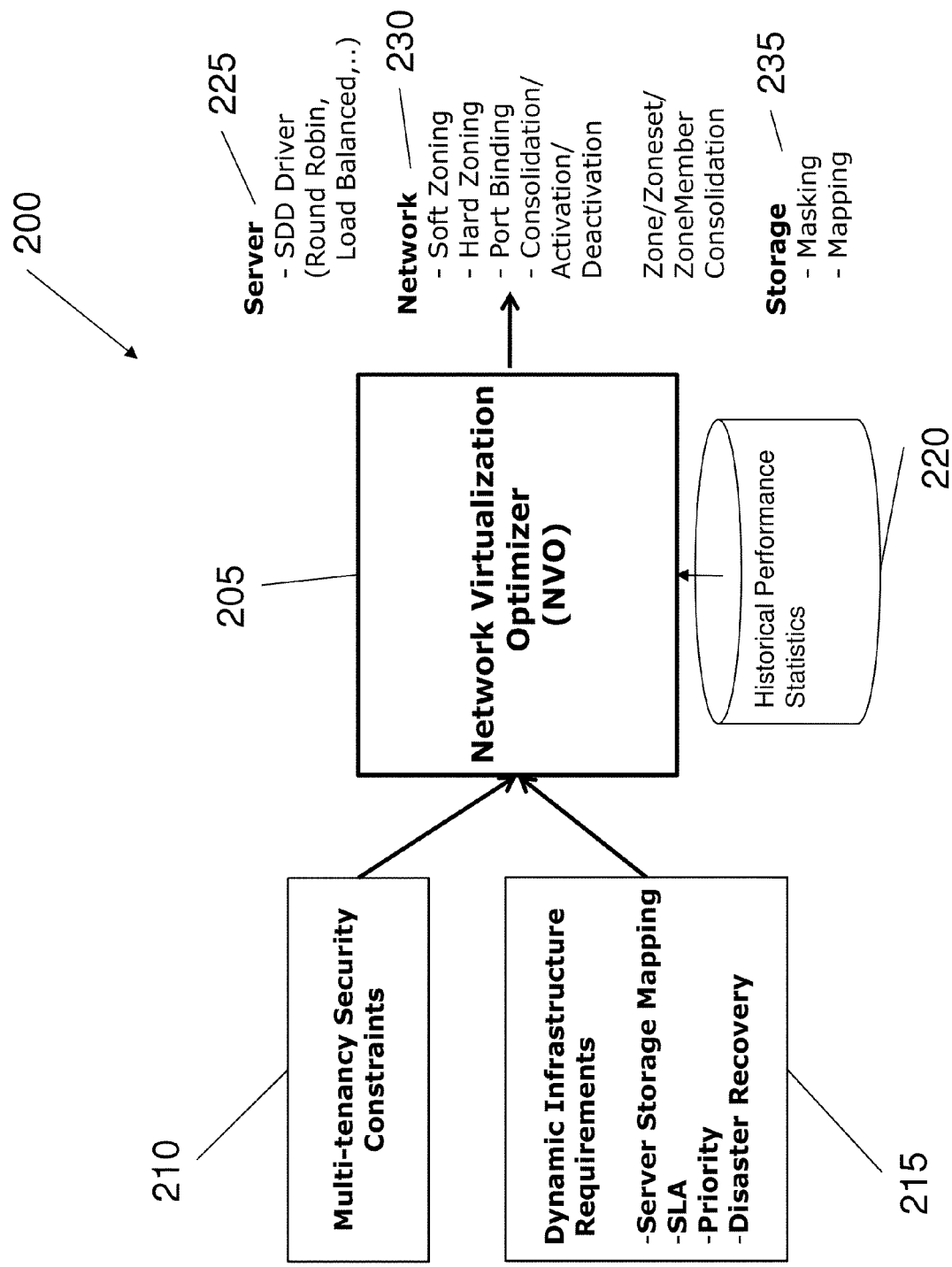
FIG. 2 illustrates a block diagram for an exemplary network virtualization optimizer (NVO) in accordance with aspects of the invention.

FIG. 2 illustrates a block diagram 200 for an exemplary NVO 205 in accordance with aspects of the invention. As shown in FIG. 2, NVO 205 is operable to receive data as inputs, for example, multi-tenancy security constraints (e.g., partitions in the virtual storage for different customers), dynamic infrastructure requirements (e.g., server storage mapping, service level agreements (SLAs), priority requirements (e.g., which servers receive priority over other servers) and/or disaster recovery requirements (e.g., failure characteristics)) and historic performance statistics 220, amongst other inputs. In embodiments, the input data may be stored in one or more storage systems, e.g., the storage system 22B of FIG. 1.

In accordance with aspects of the invention, the NVO 205 is operable to determine, e.g., dynamically in real time, a server optimization 225, a network optimization 230 and/or a storage optimization 235. In embodiments, the server optimization 225 may include using a Multipath Driver and may utilize, for example, a round robin, random and/or load balancing methodology, amongst other methodologies. The storage optimization 235 may include masking and/or mapping techniques. The server optimizations 225 and the storage optimization techniques are well understood by those in the art, such that a further description of these techniques is not necessary for those of ordinary skill in the art to understand the present invention.

The network optimization 230 may include a determination of one or more of a soft zoning, a hard zoning, a port binding, consolidation/activation/deactivation and zone/zone set/zone member consolidations, in accordance with aspects of the invention. In other words, the present invention is operable to determine one or more parameters (e.g., a soft zoning, a hard zoning, a port binding, consolidation/activation/deactivation and zone/zone set/zone member consolidations), as described further below, for configuring the virtual network in order to dynamically optimize the virtual network.

Figure 3:
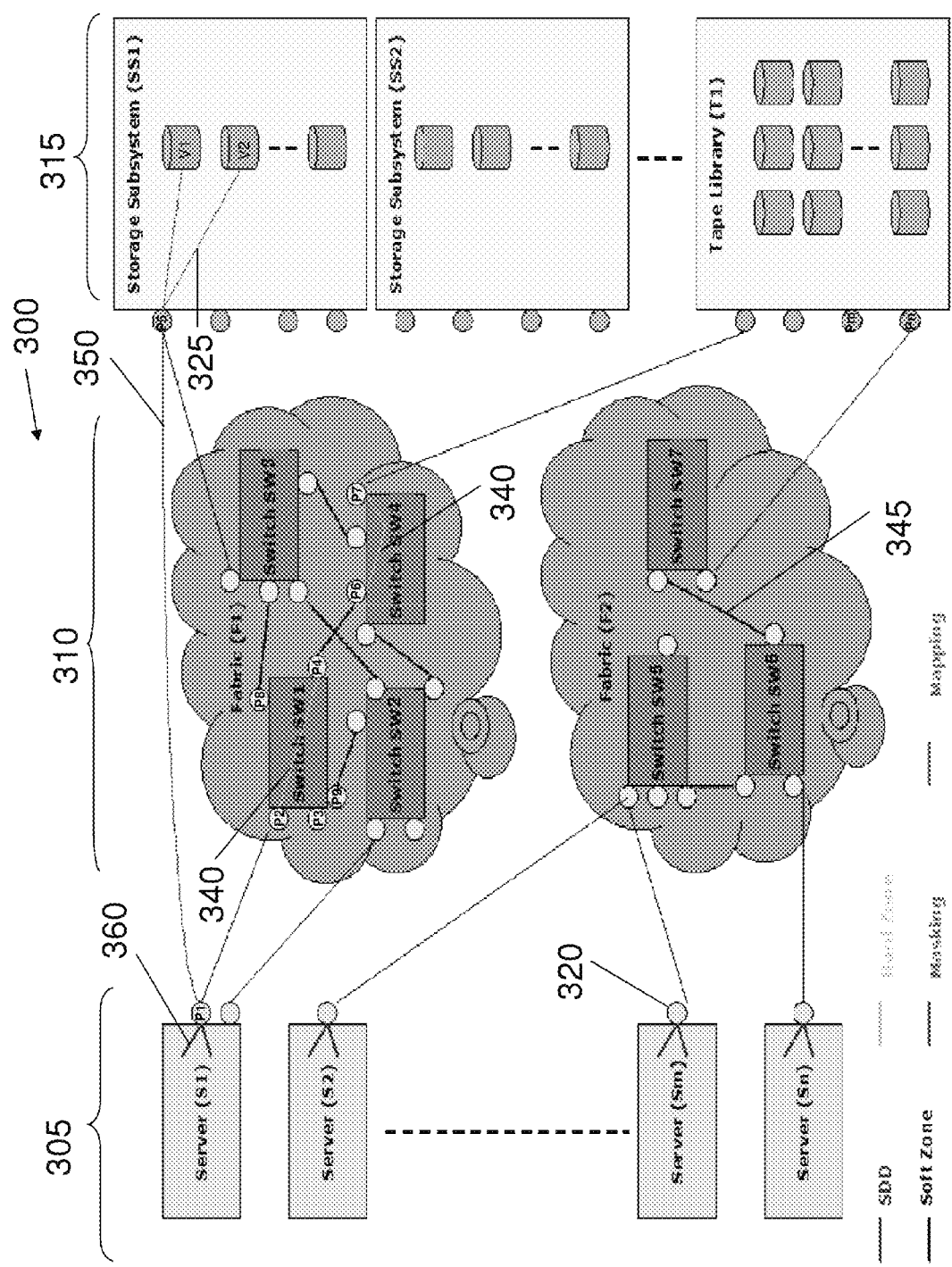
FIG. 3 illustrates an exemplary data center configuration in accordance with aspects of the invention.

FIG. 3 illustrates an exemplary data center configuration 300 as determined by the NVO 205 in accordance with aspects of the invention. In embodiments, as discussed below, the exemplary data center configuration 300 may be transformed into a directed graph G (N, E), comprising a set N vertices or nodes representative of a port, and a set E of ordered pairs of vertices, called arcs, directed edges, or arrows, as would be understood by those having ordinary skill in the art.

As shown in FIG. 3, an exemplary data center includes a server layer 305, a storage layer 315, and a network layer 310 situated between the server layer 305 and the storage layer 315. In embodiments, the server layer 305 comprises one or more servers (e.g., servers S1, S2 . . . Sn), which may include, for example, one or more logical volumes and one or more multipath drivers 360. In embodiments, the network layer 310 comprises one or more fabrics (e.g., fabrics F1 and F2), which each comprise a collection of switches, e.g., fibre channel (FC) switches. In embodiments, the storage layer 315 comprises, for example, one or more storage subsystems (e.g., storage subsystems SS1 and SS2) and/or one or more tape libraries (e.g., tape library T1). In embodiments, a storage subsystem (e.g., storage subsystem SS1) comprises one of more volumes (e.g., V1 and V2), which may be one or more virtual volumes and/or one or more physical volumes.

Associated with each of the server layer 305, the storage layer 315, and the network layer 310 are a plurality of ports 320 (e.g., P1, P2, etc.), which may include, for example, a network interface card, e.g., a host bus adapter (HBA) card, and one or more fibre channel (FC) ports, and which serve as potential connection points between the layers (e.g., the server layer 305, the network layer 310 and the storage layer 315). The present invention may utilize a plurality of ports 320, for example, at the server layer 305, the network layer 310 and/or the storage layer 315, to create, for example, a plurality of configurable redundant paths from the server layer 305 through the network layer 310 to the storage layer 315. In accordance with aspects of the invention, the NVO 205 is operable to dynamically determine one or more optimizations for the server layer 305, the network layer 310 and the storage layer 315, for example, by configuring paths from the server layer 305 through the network layer 310 to the storage layer 315.

For example, the NVO 205 is operable to determine one or more multipath driver settings of the server layer 305. In embodiments, the multipath driver settings may include round robin, random and/or load balanced settings, amongst other multipath driver settings. As shown in FIG. 3, the multipath driver maps a server (e.g., server (S1)) to a port 320 (e.g., port P1) of server S1.

Additionally, the NVO 205 is operable to determine the storage layer optimizations (e.g., masking 350 and/or mapping 325). As is understood by those having ordinary skill in the art, a mapping links, e.g., a port, e.g., P5, of a storage system (e.g., storage subsystem SS1) to a particular volume (e.g., V1) of the storage system.

In accordance with aspects of the invention, the masking 350 indicates a permitted connection (or a visibility) between the server layer 305 and the storage layer 315. As should be understood, the masking 350, however, is not the data path between, e.g., port P1 of server S1 and port P5 (e.g., a storage controller port) of the storage subsystem SS1. Instead, the actual data path is through the network layer 310 (e.g., one or more switches (e.g., SW1) of one or more fabrics (e.g., F1 and/or F2) as described further below. In accordance with aspects of the invention, the NVO 205 utilizes one or more maskings 350 to indicate which server of the server layer 305 should be permitted and/or configured (e.g., be visible) to connect to which storage system of the storage layer 315. That is, with the exemplary data center configuration 300, for example, masking 350 indicates that network layer 310 should be configured that port P1 of server S1 is visible to port P5 of storage subsystem SS1, i.e., in order to pass data from the port P1 of server (S1) to port P5 of the storage subsystem (SS1) through one or more some paths in the network layer.

In accordance with additional aspects of the invention, a tuple, e.g., comprising a masking and a mapping, represents a grouping of ports (e.g., of a server layer and a storage layer) and one or more volumes of a storage subsystem indicating that a port of the server layer can write to a port of the storage layer and "talk" to one or more volumes of a storage layer. For example, as shown in FIG. 3, a tuple "P1, P5, V1" is illustrated between server S1 and volume V1 of storage subsystem SS1. In accordance with aspects of the invention, the NVO 205 is operable to create (e.g., in real time) and/or dynamically control one or more tuples to optimize the network layer. That is, for example, by utilizing one or more tuples (i.e., maskings 350 and mappings 325) it is not necessary for all ports 320 of a server layer 305 to be configured to see all ports 320 of a storage layer 315. Additionally, by utilizing one or more tuples it is not necessary for each port 320 of a storage subsystem of the storage layer 315 to see each volume of each respective storage subsystem. In accordance with aspects of the invention, by eliminating a need for all ports of a server layer to be configured to see all ports of a storage layer, the NVO is operable to optimize the network layer 310. The NVO 205 is operable to store (e.g., in storage system 22B of FIG. 1) and/or dynamically update one or more tuples, e.g., in real time.

The NVO 205 is also operable to dynamically determine and/or configure (e.g., in real time) one or more hard zones 340 and/or soft zones 345 to determine one or more mappings (e.g., optimal mappings) within the network layer 310 to enable a port of a server to see a port of the storage system. In embodiments, as described below, the NVO 205 is operable to determine one or more optimal mappings (e.g., for one or more fabrics), for example, dynamically in real time, based on performance metrics at one or more ports (e.g., P1, P2, . . . Pm and/or Pn). In embodiments, the performance metrics may be stored in a storage system, for example, storage system 22B of FIG. 1, which may comprise one or more databases.

In accordance with aspects of the invention, a soft zone is a connection between one or more switches (e.g., SW1, SW2, SW3 and SW4, etc.) within a fabric (e.g., F1) of the network layer 310. By creating and/or utilizing one or more soft zones, the present invention is operable to configure and/or optimize, e.g., in real time, one or more paths for traffic from e.g., port P1 of server S1 to, e.g., port P5 of storage subsystem SS1. In embodiments one switch may be the manager of the one or more other switches in a fabric. Additionally, the NVO 205 is operable to active and/or deactivate one or more soft zones 345 in order to manage and/or optimize, e.g., in real time, traffic flow from the server layer 305, for example, via P1, to the storage layer 315, for example, via P5. The NVO may activate one or more soft zones, e.g., as designated by using a tuple identifying an active connection between a port of the server layer 305 and a port of the storage layer 315. For example, with tuple "P1, P5, V1" or more soft zones are activated between P1 and P5 so that if there is any traffic from P1 to P5 the soft zones in a fabric of the network layer will allow that traffic through the network layer. Conversely, by deactivating a zone, the NVO 205 is operable to prevent a port of the server layer 305 from seeing a port of the storage layer 315.

In accordance with additional aspects of the invention, a hard zone 340 is used to guide traffic within a switch of a fabric in the network layer 310. That is, a hard zone 340 represents a traffic flow between two or more ports of a switch. For example, as shown in FIG. 3, a hard zone 340 is illustrated between port P2 and port P4 of switch SW1. Thus, with hard zone 340 between port P2 and port P4 as illustrated in the exemplary configuration of FIG. 3, port P2 is configured to only write via port P4 (i.e., cannot utilize ports P8 or P9). Additionally, as shown in FIG. 3, a hard zone 340 is illustrated between port P6 and port P7 of switch SW4. Thus, with hard zone 340 between port P6 and port P7 as illustrated in the exemplary configuration of FIG. 3, port P6 is configured to only write via port P7. In embodiments, the NVO 205 is operable to use TCP/IP port binding, understood by those having ordinary skill in the art, with the one or more soft zones 345 and one or more hard zones 340.

By utilizing one or more hard zones 340, the present invention is operable to prevent unauthorized access to the storage layer 315 through the network layer 310. For example, as shown in the exemplary network configuration of FIG. 3, port P3 is open, or not connected. Thus, a hacker might attempt to connect a server Sx (not illustrated) to the network layer 310 via port P3. The server Sx may emulate a similar port number as port P1, such that Sx can now see port 5. Thus, in accordance with aspects of the invention, the NVO 205 is operable to create and/or dynamically control one or more hard zones 340 to guide traffic within one or more switches in a fabric layer of the network layer. For example, with hard zone 340 between port P2 and port P4 as illustrated in the exemplary configuration of FIG. 3, traffic is guided such that only port P2 is configured to see port P4. Thus, where a hacker to attempt to connect to the network layer 310 via port P3, the hard zone 340 between port P2 and port P4 would prevent such an attempt.

Figure 4:
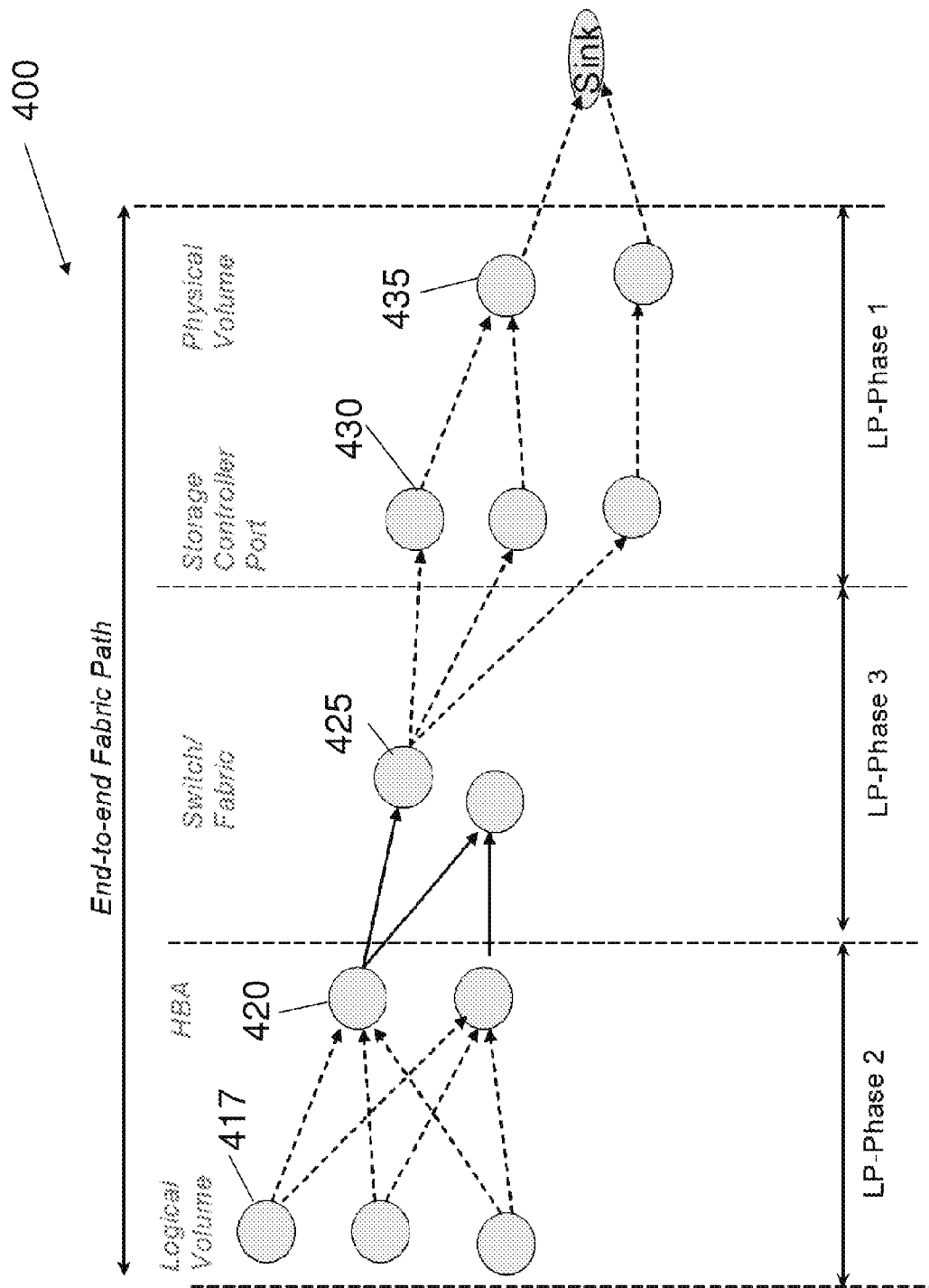
FIG. 4 illustrates an exemplary end-to-end path optimization methodology in accordance with aspects of the invention.

FIG. 4 illustrates an exemplary end-to-end path optimization methodology 400 in accordance with aspects of the invention. As shown in FIG. 4, the exemplary path optimization methodology 400 comprises three linear programming phases, i.e., LP-Phase 1, LP-Phase 2 and LP-Phase 3. In accordance with aspects of the present invention, an aim of the path optimization process is to continuously, e.g., in real time, optimize the end-to-end flow I/O flow from the servers of the server layer 305 to the physical disks of the storage layer 315. A path starts with logical volumes 417 within the one or more servers of the server layer 305 that are mapped to one or more HBAs 420 of the server layer 305. The HBAs 420 are physically connected to one or more fabrics 425 of the network layer 310. Additionally, as shown in FIG. 4, the fabric 425 is connected to storage controller ports 430, which are mapped to one-or-more physical volumes 435. The one-or-more physical volumes 435 map to a sink. With this exemplary end-to-end path optimization methodology 400, the fabric is treated as a single switch in order to illustrate the present invention. Internal switch-to-switch routing within a fabric is controlled by routing tables maintained using the standard network protocols.

The exemplary end-to-end path optimization methodology 400 is configured as a linear programming model. As is understood by those having ordinary skill in the art, linear programming (LP) is a mathematical method for determining a way to achieve the best outcome (such as maximum profit or lowest cost) in a given mathematical model for some list of requirements represented as linear equations. More formally, linear programming is a technique for the optimization of a linear objective function, subject to linear equality and linear inequality constraints. For example, given a polyhedron and a real-valued affine function defined on this polyhedron, a linear programming method will find a point on the polyhedron where this function has the smallest (or largest) value if such point exists, by searching through the polyhedron vertices. Additionally, in embodiments, for example, in specific cases, the end-to-end path optimization methodology 400 can be represented as a network flow problem, as would be understood by those of ordinary skill in the art, e.g., using a directed graph G (N, E).

In embodiments, the output of the optimization process (e.g., the determination of the NVO 205) is a flow representation that is enforced using orchestration at various levels. The various levels may include, for example: multipath driver at server layer 305 (e.g., load balanced, and/or round robin, etc.); zoning at network layer 310 (e.g., soft zoning, hard zoning and/or TCP/IP port binding); and/or assignment at storage layer 315 (e.g., masking and or mapping).

In accordance with aspects of the present invention, the NVO 205 is operable to determine one or more optimal paths by dividing the determination into three phases of linear programming. In embodiments, the three phases are executed sequentially instead of dealing with a complex end-to-end optimization. The division follows the Separation of Concern (SoC) paradigm wherein, for example, constraints are localized instead of being reflected within a single global objective function. As is understood by those having ordinary skill in the art, SoC is a process of separating, for example, a computer program into distinct features that overlap in functionality as little as possible. A concern may be any piece of interest or focus in a program.

As shown in FIG. 4, the exemplary path optimization methodology 400 comprises three linear programming phases, i.e., LP-Phase 1, LP-Phase 2 and LP-Phase 3. In accordance with aspects of the invention, with LP-Phase 1 an aim is to map the storage controller ports 430 to the physical volumes 435. In embodiments, an aim for LP-Phase is to load-balance the total traffic for the volumes across all the available controller ports. An exemplary approach to load-balance the total traffic for the volumes across all the available controller ports is as shown below as representation (1):

$$\sum_{p=1}^{nports} lp - (TL/nports) \text{ MIN} \tag{1}$$

where: lp represents a load on the individual storage controller port; TL represents a total load across all the logical volumes; and nports represents a number of available ports within a storage controller. Factors affecting the load-balance of the total traffic may include, for example: 1) a current load on the individual volumes; and/or 2) saturation bandwidth for the available ports.

With LP-Phase 2 an aim is to map the logical volumes 417 of the server layer 305 to the one or more physical HBAs 420. In accordance with aspects of the invention, the NVO 205 is operable to determine a mapping while accounting for the existing configuration of the multipath driver, for example, load balanced, round-robin, etc. Factors (or constraint) affecting the load-balance of the total traffic may include, for example, the physical connectivity of the HBA to the switch. In embodiments, it is possible to add multiple additional constraints based on non-performance aspects such as HBA reliability, packet drop rate and/or reported errors, etc.

With LP-Phase 3 an aim is to map the HBAs 420 to storage controller ports 430 via the switch/fabric configuration 425. In embodiments, constraints for this mapping include: logical volumes 417 in the server and HBAs 420 are mapped appropriately to the physical ports 430 connecting to the physical volumes 435 within the controller. The maximum available bandwidth of the switch in-out ports is not exceeded. Moreover, in accordance with aspects of the invention, the bandwidth of the storage controller ports 430 is guaranteed to be within bounds by the LP-Phase 1 optimization.

Along with the configuration details of the end-to-end path optimization methodology 400 described above, performance statistics of the nodes (e.g., ports P1, P2, P3, etc.) are also stored in the data structure (e.g., in storage system 22B of FIG. 1). In embodiments, performance data associated with the nodes may be represented in a time series fashion. In accordance with aspects of the invention, the NVO 205 may include trending/forecasting methodologies to provide future trending of performance data for the nodes based on the stored performance data. In embodiments, the trending/forecasting methodologies can also be overridden by a user. Performance statistics collected for nodes (e.g., ports P1, P2, P3, etc.) may be derived from the Common Information Model (CIM) information.

As is understood by those of ordinary skill in the art, CIM is an open standard that defines how managed elements in an IT environment are represented as a common set of objects and relationships between them, which is intended to allow consistent management of these managed elements, independent of their manufacturer or provider. An exemplary and non-exhaustive list of CIM information include: FC port statistics; NOS count; error frames; dumped frames; linked failures; loss of signal counter; loss of sync counter, amongst other CIM information.

Additionally, in embodiments, for example, in specific cases, the end-to-end path optimization methodology 400 can be represented as a network flow problem, as would be understood by those of ordinary skill in the art, e.g., using a directed graph G (N, E), comprising a set N vertices or nodes representative of a port, and a set E of ordered pairs of vertices, called arcs, directed edges, or arrows, as would be understood by those having ordinary skill in the art. According to aspects of the invention, the NVO 205 is operable to gather performance metrics data (e.g., traffic flows, performance characteristics and/or node statistics) and determine correlations there from (e.g., one or more optimized paths). For example, the NVO 205 may utilize one or more existing data center tools to collect performance metrics (e.g., a system management suite).

For example, Node N is representative of a FCPort and Each node N has Fan-in and Fan-out and statistics associated therewith, for example, N(Fi, Fo, Fs). Fs=derivation of FCPort Statistics and FCPortRateStatistics. Additionally, in embodiments, any vendor extended additional information or information in any alternate format can also easily be accommodated.

In accordance with aspects of the invention, I/O traffic flow in a storage area network is enabled at the server layer 305, the network layer 310 and the storage layer 315. In a fiber channel storage area network, primitives are available for invocation at different layers for I/O traffic enablement, which include: multipath driver at server layer 305 (e.g., load balanced and/or round robin); zoning at network layer 310 (e.g., soft zoning, hard zoning and/or port binding) and assignment at storage layer (e.g., masking and/or mapping). Based on the invocation of one or more of the above primitives, the I/O traffic flow in the storage area network transforms into a directed graph.

An exemplary methodology for the transformation is described, wherein for example, each node in the graph includes the following information associated with it: node type (e.g., RemoteDisk, StorageVolume, HBA-FCPort, Switch-FCPort, StorageSubsystem-FCPort); fan-in; fan-out; derived minimum, maximum and average I/O traffic for each FC port; temporal characteristics based on trending and zoneset activation and/or deactivation (e.g. online transactional processing (OLTP) workload during the day and backup workload during night); and/or growth characteristics for each Server, and FCPort.

In accordance with exemplary methodology, the NVO 205 is operable to determine for the fabric: fan-in: 1 . . . n based on Zoneset activation, Zone Members of Soft Zone, Hard Zone activation and/or port binding; fan-out: 1 . . . n based on Zoneset activation, Zone Members of Soft Zone, Hard Zone activation and/or Port binding. Furthermore, in accordance with exemplary methodology:

| FLOW DIAGRAM |
| --- |
| Migrate |
| if (offline) |
| { |
| Remove current configuration |
| Deploy proposed plan |
| } |
| else if (online) |
| { |
| Deploy proposed plan and activate |
| Remove current configuration based on traffic pattern |
| } |

FIG. 5 shows an exemplary flow for performing aspects of the present invention. The steps of FIG. 5 may be implemented in the environment of FIG. 1, for example. The flow diagram may equally represent a high-level block diagram or a swim-lane diagram of the invention. The flowchart and/or block diagram in FIG. 5 (and any other flowcharts and/or block diagrams) illustrates the architecture, functionality, and operation of possible implementations of systems, methods and computer program products according to various embodiments of the present invention. In this regard, each block in any of the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 5 depicts an exemplary flow 500 for a process in accordance with aspects of the present invention. More specifically, exemplary flow 500 illustrates a process for determining a network virtualization optimization. As shown in FIG. 5, at step 505 the process starts. At step 510, the NVO receives and/or determines server layer data. In embodiments, the server layer data includes, for example: physical to virtual machine layer relationships; all remote disks accessible; all HBA and all the associated FC ports with the HBAs; the type of multipath drivers present; the multipath driver setting (round robin, random, load balance, etc.); and establish node (e.g., remote attached disk, HBA FC port) and establish connectivity. At step 515, the NVO determines storage layer data and configures the storage layer. In embodiments, the determination and configuration of the storage layer data includes, for example: determine an assignment (masking and/or mapping) for all storage controller and all virtualization appliances, and for each storage volume; and establishing node (FC port, storage volume) and establish connectivity based on the assignment-mapping information.

At step 520, the NVO determines and/or configures server-storage layer data. In embodiments, the determination and/or configuration of the server-storage layer data includes: a determination of fabric connectivity for each server port; a determination of fabric connectivity for each storage FC port; and establishment of a node (fabric) and establishment of connectivity. At step 525, the NVO determines and/or configures server-fabric-storage layer data. In embodiments, the determination and/or configuration of the server-fabric-storage layer data includes: a determination of virtual fabric information; determination of all switches and FC ports in the fabric; discarding of the FC ports that are not connected; discarding of the FC ports switched off through portB; and expand node (fabric) defined in the above layer. Additionally, the NVO is operable to, for example, if soft zone is enabled: establish node (switch FC port); establish initiator port, target port and/or fabric linkage, wherein traffic from the initiator port can flow to the target port through any ports in the fabric, e.g., based on a dynamic fabric routing table. Furthermore, the NVO is operable to, for example, if hard zone is enabled: establish node (switch FC port); and establish initiator port, target port and/or fabric linkage by each individual switch port to switch port zoning. At step 530, the NVO is operable to determine one or more I/O traffic flow optimizations (e.g., an optimized flow plan). At step 535, the process ends. As indicated by the dashed line shown in FIG. 5, optionally, the process may then proceed to step 505.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to determine, by a network virtualization optimizer, one or more mappings between a server layer, including a plurality of servers, and a storage layer through a network layer based on a plurality of inputs to the network virtualization optimizer, including one or more multi-tenancy security constraints regarding partitions in virtual storage for different customers of a virtual network, and dynamic infrastructure requirements for the servers and the storage layer, including priority requirements as to priority among the plurality of servers for accessing the storage layer and disaster recovery requirements, wherein the one or more mappings between the server layer and the storage layer dynamically changes a network layer configuration from a first network layer configuration to an updated network layer configuration by changing a configuration of switches in the network layer based on the one or more mappings.

2. The method of claim 1, wherein the determining the one or more mappings comprises determining at least one hard zone.

3. The method of claim 2, wherein the at least one hard zone is in the network layer.

4. The method of claim 2, wherein the determining the at least one hard zone comprises dynamically determining the at least one hard zone within the network layer.

5. The method of claim 2, wherein the at least one hard zone enables a port of a server to see a port of a storage system.

6. The method of claim 2, wherein the at least one hard zone directs traffic between two or more ports of a switch in the network layer.

7. The method of claim 2, wherein the programming instructions are further operable to configure the at least one hard zone to prevent unauthorized access to at least one of the storage layer, the network layer and the server layer.

8. The method of claim 1, wherein the determining the one or more mappings comprises determining at least one masking.

9. The method of claim 8, wherein the at least one masking indicates a server of the server layer permitted to connect to a storage system of the storage layer.

10. The method of claim 2, wherein the at least one hard zone guides traffic within a switch of a fabric in the network layer.

11. The method of claim 10, wherein the at least one hard zone represents a traffic flow between two or more ports of the switch.

\* \* \* \* \*